J. J. MIDDLEBROOK.
FOUR-WHEEL DRIVE FOR TRUCKS.
APPLICATION FILED AUG. 21, 1916.
1,249,449.
Patented Dec. 11, 1917.
3 SHEETS—SHEET 3.
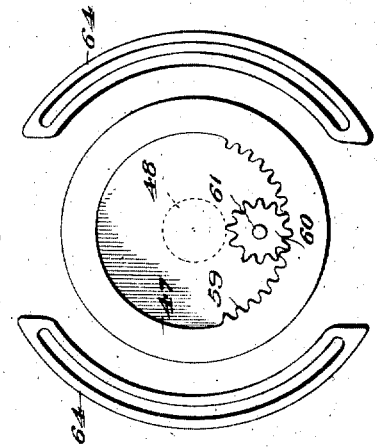
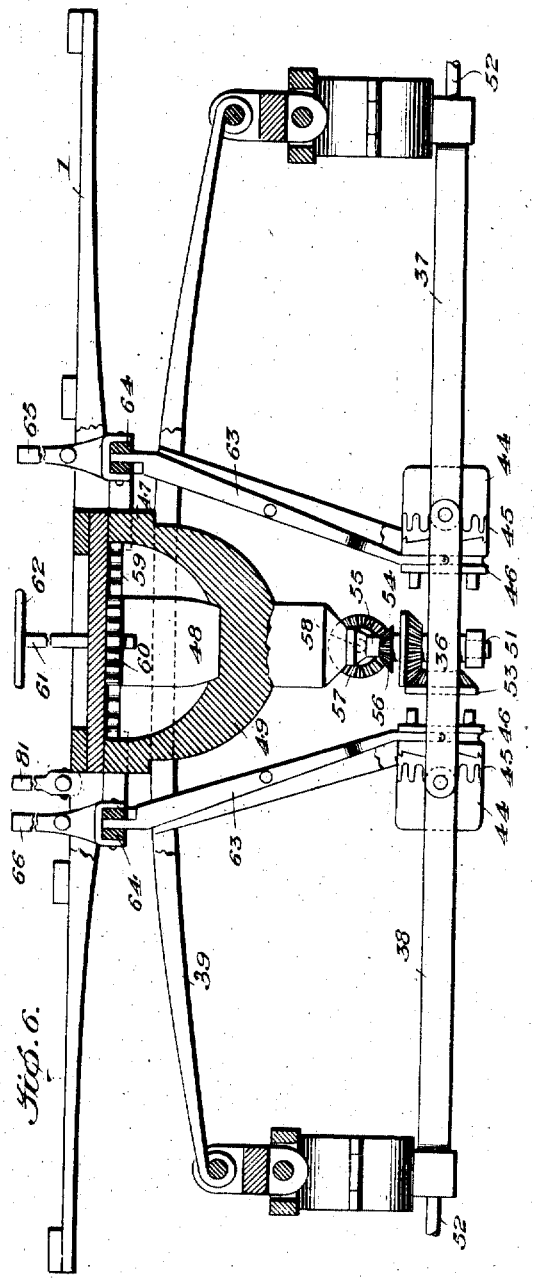
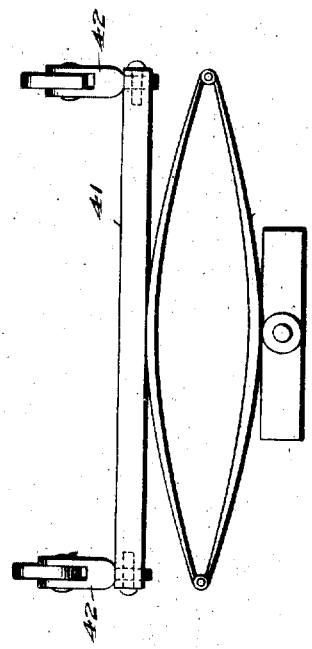

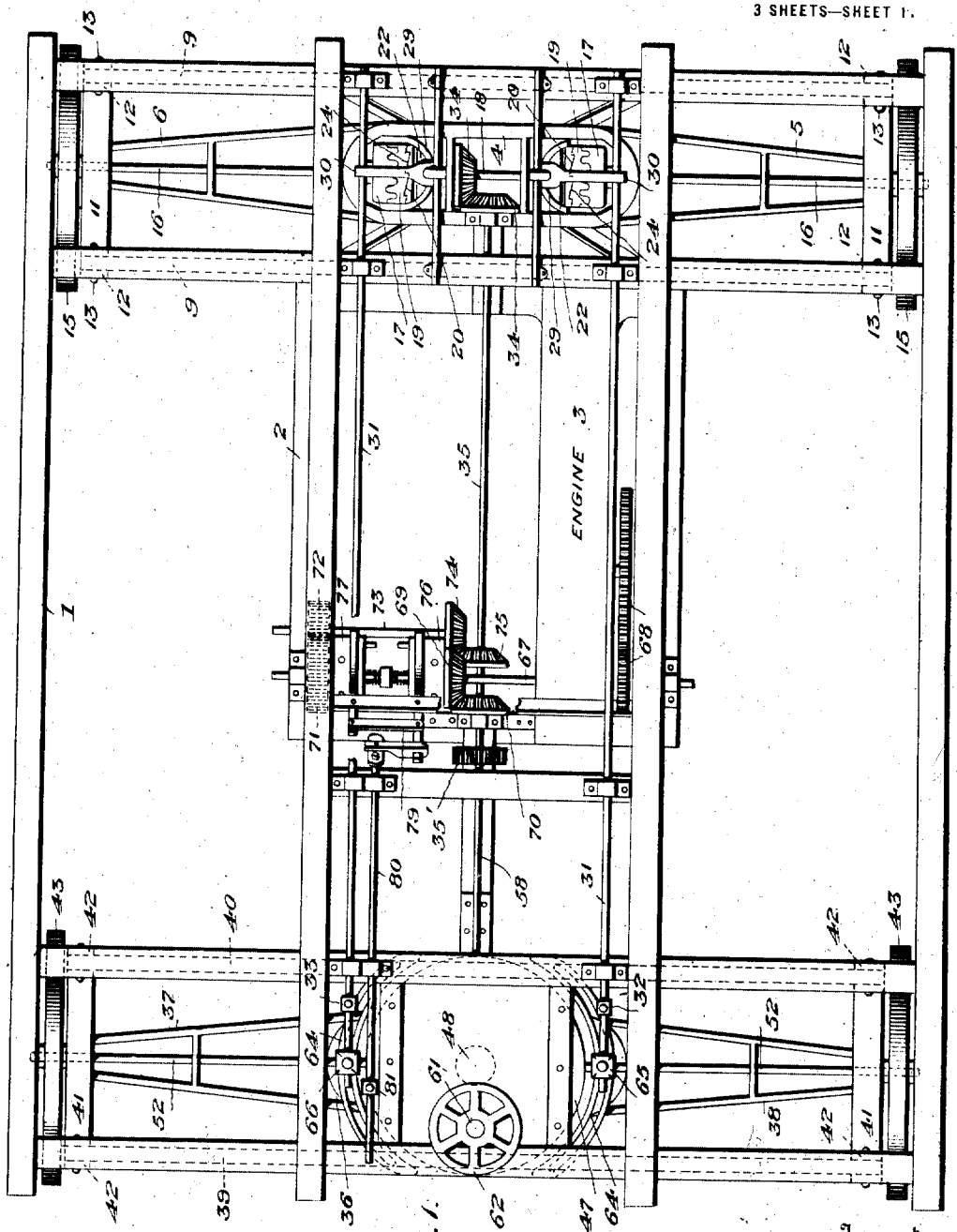

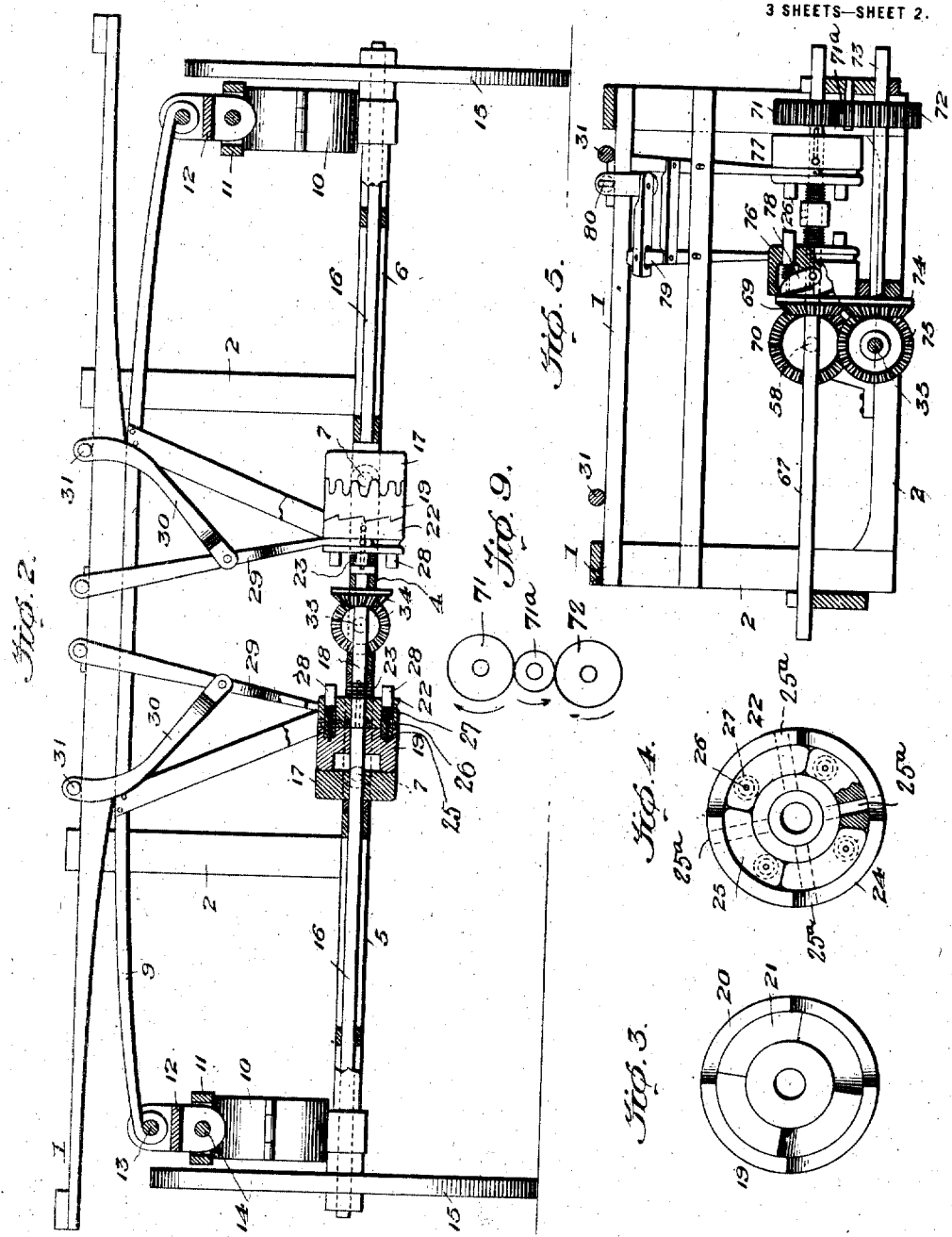

ized by the springs 9. The engine 3 has a fly wheel 15 provided with a clutch member 16 which controls a double clutch 17 having clutch members 18 and 19, these being loose on the shaft 20 and connected to engage or disengage clutch member 16 by means of levers 21 operated from the treadle mechanism 22 through rods 23 and lever system 24.

UNITED STATES PATENT OFFICE.

JAMES JOSHUA MIDDLEBROOK, OF BRIMLEY, MICHIGAN.

FOUR-WHEEL DRIVE FOR TRUCKS.

1,249,449.  Specification of Letters Patent.  Patented Dec. 11, 1917.

Application filed August 21, 1916. Serial No. 116,009.

*To all whom it may concern:*

Be it known that I, JAMES JOSHUA MIDDLEBROOK, a subject of the King of Great Britain, residing at Brimley, county of Chippewa, and State of Michigan, have invented certain new and useful Improvements in Four-Wheel Drives for Trucks, of which the following is a specification.

This invention relates to four-wheel drives for trucks.

My object is to provide an improved four-wheel drive for trucks wherein each wheel is subject to independent control to adapt it to be positively driven, or, to be thrown out of operative connection with its drive shaft and wherein the rear wheels and the front wheels, may be utilized for propulsion.

Each wheel is controlled by its own clutch so that any wheel may be driven while the remaining wheels are idle, or, either pair of wheels simultaneously driven. By throwing the wheels into or out of gear, short turning and reversing is readily accomplished and the necessity of employing a differential gear entirely obviated.

A double clutch is employed with reversing gears for driving the four ground wheels forwardly or backwardly to cause the truck to advance, or, to back.

A further object is the provision of a novel jointed or three-piece shaft or axle with improved spring supports, and improved driving means, whereby the respective wheels and their jointed axles can rise and fall independently of all the remaining ones and will be spring-cushioned and thus the jar from rough roads or obstacles encountered will be carried by the springs, and the clutches and driving gears and engine relieved of strain.

The front three-piece axle is mounted to turn and to be operated by steering means without interfering with the driving of the front wheels.

The engine is located intermediate the front and rear of the chassis in a suspended position, thus substantially equalizing the distribution of driving power to the front and rear axles and balancing the truck whether it is running light or loaded, as also affording clear space for the truck body.

Preferably, improved clutches having spring pawls or dogs and themselves spring-actuated, are employed, whereby jolts are cushioned and the clutches are prevented from being accidentally engaged, beside adapting them for rapid and smooth clutching and unclutching.

Being aware that changes of construction may be resorted to in carrying out the invention without departing from the essential principles thereof, the following description and disclosure of the drawings is to be considered as illustrative, rather than restrictive, of the scope of the invention.

In the accompanying drawings:

Figure 1 is a plan view;

Fig. 2, a rear end elevation, certain parts being in section and others broken away;

Figs. 3 and 4, details of one of the clutches;

Fig. 5, an elevation showing the controlling clutches and gearing in the vicinity of the engine;

Fig. 6, a front end elevation, certain parts being in section and others broken away;

Fig. 7, a detail end view of one of the spring supports;

Fig. 8, a detail bottom view of the steering gear and slotted yokes, and Fig. 9 is a diagrammatic detail view of certain gearing.

The chassis 1 has a suspended frame 2 located substantially centrally thereof constituting a support or bed for the engine 3 and a means for supporting the controlling gearing hereinafter described.

The rear axle is composed of a center section 4 and end sections 5 and 6 suitably trussed and jointed at 7 to the center section. The center section is suspended by hangers from a pair of transversely arranged springs 9. The outer ends of the jointed sections 5 and 6 are connected to bowed springs 10 which are in turn, fastened to yokes 11, the latter being suspended from the ends of the springs 9 by knuckles 12 pivoted at 13 to the springs and at 14 to the yoke 11. The joints thus provided permit the axle sections 5 and 6 to rise and fall independently of each other and with any necessary freedom and at the same time, the axle sections 5 and 6 are cushioned by the springs 9 and 10.

The center section 4, being suspended from the springs 9, is cushioned, but not designed for the up and down movement which is required by the sections 5 and 6. The jointing of the sections 5 and 6 to the section 4 adapts the wheels 15 to any character of pavement or road or ground and if an obstacle is encountered by one wheel, it rides thereover without tilting or disturbing the general level condition of the truck.

The wheels 15 are carried by shafts 16 which are provided with crown knuckle gears 17 of the form shown in Fig. 2.

The section 4 carries a countershaft 18 on which the crown knuckle gears 19 are loosely mounted, said gears meshing with the gears 17. The crown knuckle gears 19 each have reversely arranged sets of clutch faces 20 and 21 (Fig. 3).

Slidably splined on the shaft 18 are clutches 22 which are urged toward the crown clutch gears 19 by springs 23 to prevent accidental disconnection by jolts or jars. The clutches 22 have clutch teeth or faces 24 (Fig. 4) adapted to engage corresponding clutch teeth 20. Carried by the clutches 22 and located in a concavity in the face thereof are pivoted pawls or dogs 25 (Figs. 2 and 4) pivoted on pins shown in dotted lines at 25ª adapted to engage the clutch teeth or faces 21 on gear 19, said teeth 21 being formed independently of, and arranged concentrically to, teeth 20 and pointing oppositely thereto. Stems 26 slidable in holes in the pawls 25, are pressed by coil springs 27 and have screw threaded parts carrying adjustable thumbnuts 28. The tension of the springs 27 and play of the pawls or dogs may thus be limited to any desired extent (Fig. 2). The clutch faces and the spring-actuated dogs or pawls provide a double lock or clutching action which holds the members 19 and 22 together, whether the truck is advancing or going backward.

The respective clutches 22 are independently controlled by shifting yokes 29 having connections 30 to independent shafts 31 extending in suitable bearings to points adjacent the operator's seat and provided with levers 32 and 33 respectively, by which devices both rear wheels may be driven, or either of them driven, or both of them thrown out entirely.

The shaft 18 is driven through bevel gears 34 by a shaft 35 operated from the engine 3, as will appear hereinafter.

The construction and mounting of the front axle 36, 37, 38 and of the springs 39, 40, yokes 41, knuckles 42, wheels 43, crown wheels 44 and 45, clutches 46, and allied parts, being the same as previously described, specific reference thereto is unnecessary.

The springs 40, instead of being directly connected to the chassis 1, are carried by a concaved steering head or fifth-wheel 47 which has a king pin 48 received in a socket member 49, these parts pivotally mounting the entire front axle, transverse and longitudinal springs and other parts referred to. The axle sections 37, 38, are adapted to independently rise and fall, according to conditions encountered by the front wheels 43, as with the rear wheels. The center axle section 36 is pivotally supported on the chassis at 51 in line with the pivot connection 48, 49. The shaft 52 on which the clutches 46 are slidably splined, carries a bevel gear 53 which meshes with a bevel gear 54 carried by a short shaft 55 which is journaled in the lower portion of the steering head or fifth-wheel 47 and also in a cross-piece on the axle 36, and said shaft also carries another bevel gear 56 which is driven by a bevel gear 57 carried by a shaft 58, in turn driven by the engine, as will presently appear.

The fifth-wheel 47 has a rack 59 which is in mesh with a pinion 60 carried by a steering stem 61 having a suitable hand-wheel 62 by the turning of which the entire front axle 36, 37, 38, with the springs 39 and 40 and other parts including the shafts for the front wheels, are turned for purposes steering. Regardless of the angular position of the front axle, the respective front wheels can rise and fall and are independently cushioned by the springs.

As with the rear wheels, so with the front wheels, both may be driven, or either driven, from the shaft 58, or both may be disconnected from operative connection thereto. For shifting the clutches 46, there are provided clutch throwers 63 pivoted intermediate their ends and having their upper ends received in slotted yokes 64 which are carried by levers 65 and 66, respectively, the latter being suitably mounted for instance, on the rock shafts 31. Being engaged with the yokes 64 at all times, the clutches 46 can be thrown into or out of operation, regardless of the angular disposition of the front axle at the time and each clutch is adapted for operation independent of the other clutch.

The engine 3 directly drives shaft 67 through gears 68. Loose on shaft 67 is a bevel gear 69 which meshes with a gear 70 on countershaft 58. Loose on shaft 67 is a spur gear 71 which meshes through an idler gear 71ª with a corresponding gear 72 on shaft 73 and the latter has a bevel gear 74 meshing with bevel gear 75 fast on the countershaft 35. Whichever one of the gears 69 or 71 is coupled to the shaft 67 determines the direction in which the shafts 35 and 58 are driven by the engine to move the truck forwardly, or backwardly. Intermeshing pinions 35' fast on shafts 35 and 58 cause these shafts to rotate together. A pair of clutches 76 and 77, respectively slidably splined to shaft 67, have spring-actuated dogs 78 adapted to engage clutch faces on the gears 69 and 71. A double clutch shifter 79 engages both clutches 76 and 77 and is adapted to simultaneously shift them so that when the clutch 76 is engaged with the gear 69, the clutch 77 is disengaged from the gear 71 and vice versa. A rock shaft 80 and lever 81 constitute means for operating the double clutch shifter 79.

Having thus described my invention, what I claim as new and desire to secure by Letters Patent, is:—

1. In a power driven truck, the combination with an axle comprising jointed sections, of wheel shafts carried thereby, supporting wheels driven by said shafts, springs for the jointed axle sections, driving means, and clutches for coupling the said wheel shafts to, or uncoupling them from, the driving means.

2. In a power driven truck, the combination with an axle comprising jointed sections, of wheel shafts carried thereby, supporting wheels driven by said shafts, springs for the jointed axle sections, driving means, and independent clutches, whereby either or both of the wheel shafts may be coupled to the driving means or uncoupled therefrom.

3. In a power driven truck, front and rear axles each comprising jointed axle sections, wheel shafts for the respective sections, wheels driven by said shafts, driving means, and clutches whereby the respective wheel shafts may be selectively coupled to, or uncoupled from, the driving means.

4. In a power driven truck, front and rear axles each comprising jointed axle sections, wheel shafts for the respective sections, wheels driven by said shafts, a clutch for each wheel shaft, driving shafts, and an engine for operating said shafts, the aforesaid clutches adapting any wheel shaft to be coupled or uncoupled for idleness or operation.

5. In a power driven truck, front and rear axles respectively comprising jointed sections adapted to move up and down, wheel shafts for the respective axle sections, wheels adapted to be driven by the respective wheel shafts, independent countershafts for driving the wheel shafts on the front and rear axles, an engine, and means for connecting the engine to either one of the countershafts, whereby the wheel shafts of the front or rear axle may be driven forwardly or backwardly.

6. In a power driven truck, front and rear axles respectively comprising jointed sections adapted to move up and down, wheel shafts for the respective axles sections, wheels adapted to be driven by the respective wheel shafts, independent countershafts for driving the wheel shafts on the front and rear axles, an engine, means for connecting the engine to either one of the countershafts, whereby the wheel shafts of the front or rear axle may be driven forwardly or backwardly, and independent clutches for the respective wheel shafts, whereby the operation of each wheel shaft may be controlled independently of that of the remaining wheel shafts.

7. In a power driven truck, an axle comprising a center section and end sections jointed thereto, supporting vehicle springs extending longitudinally of the axle, yokes connecting said springs, other springs connected to the yokes and to the end axle sections, wheel shafts carried by the end axle sections, wheels adapted to be driven by said wheel shafts, and means for driving the wheel shafts.

8. In a power driven truck, an axle comprising a center section and end sections jointed thereto, supporting vehicle springs extending longitudinally of the axle, yokes connecting said springs, other springs connected to the yoke and to the end axle sections, wheel shafts carried by the end axle sections, wheels adapted to be driven by said wheel shafts, a shaft carried by the center section, articulated operative connections between the wheel shafts and said shaft, and means for driving said shaft.

9. In a power driven truck, an axle comprising a center section and end sections jointed thereto, supporting vehicle springs extending longitudinally of the axle, yokes connecting said springs, other springs connected to the yokes and to the end axle sections, wheel shafts carried by the end axle sections, wheels adapted to be driven by said wheel shafts, a shaft carried by the center section, articulated connections between said shaft and the wheel shafts, clutches for connecting the articulated connection to the shaft, whereby either one or both of said wheel shafts may be operated, and an engine driven shaft adapted for operating the shaft of the center section.

10. In a power driven truck, a steering driving axle comprising a pivoted center section, end sections jointed to the center section and adapted for up and down movement, wheel shafts carried by the end axle sections aforesaid, wheels driven by said shafts, a fifth-wheel or steering head, means for turning said steering head, and means for driving the wheel shafts aforesaid.

11. In a power driven truck, a steering driving axle comprising a pivoted center section, end sections jointed to the center section and adapted for up and down movement, wheel shafts carried by the end axle sections aforesaid, wheels driven by said shafts, a fifth-wheel or steering head, means for turning said steering head, means for driving the wheel shafts aforesaid, clutches which control the operation of the wheel shafts from the driving means, clutch shifters carried by the center section, and rockable arc-shaped clutch shifter operators with which the clutch shifters have a loose or sliding engagement, whereby the clutch shifters may be operated regardless of the angular disposition of the steering axle.

In testimony whereof, I hereunto affix my signature.

JAMES JOSHUA MIDDLEBROOK.